(12) United States Patent
Peyron

(10) Patent No.: US 7,261,107 B2
(45) Date of Patent: Aug. 28, 2007

(54) BREATHABLE PRESSURIZED-GAS REDUCING VALVE

(75) Inventor: Nicolas Peyron, La Gaude (FR)

(73) Assignee: La Spirotechnique Industrielle et Commerciale, Paris (FR)

( * ) Notice: Subject to any disclaimer, the term of this patent is extended or adjusted under 35 U.S.C. 154(b) by 588 days.

(21) Appl. No.: 10/338,554

(22) Filed: Jan. 8, 2003

(65) Prior Publication Data
US 2004/0168688 A1    Sep. 2, 2004

(30) Foreign Application Priority Data
Jan. 8, 2002    (FR) .................................. 02 00149

(51) Int. Cl.
*A62B 9/02*    (2006.01)
*A61M 16/00*    (2006.01)

(52) U.S. Cl. .............................. 128/205.24; 128/204.26
(58) Field of Classification Search ........... 128/204.26, 128/201.28, 205.24; 137/197
See application file for complete search history.

(56) References Cited

U.S. PATENT DOCUMENTS

| 1,456,570 A | 5/1923 | Reed |
| 4,558,696 A | 12/1985 | Eiserman et al. |
| 5,413,096 A | 5/1995 | Hart |
| 6,601,609 B2 * | 8/2003 | Taylor ..................... 137/614.2 |

* cited by examiner

*Primary Examiner*—Teena Mitchell
*Assistant Examiner*—Amadeus Lopez
(74) *Attorney, Agent, or Firm*—Linda K. Russell; Brandon S. Clark

(57) ABSTRACT

A reducing valve, which includes a water trap, especially useful in diving.

5 Claims, 1 Drawing Sheet

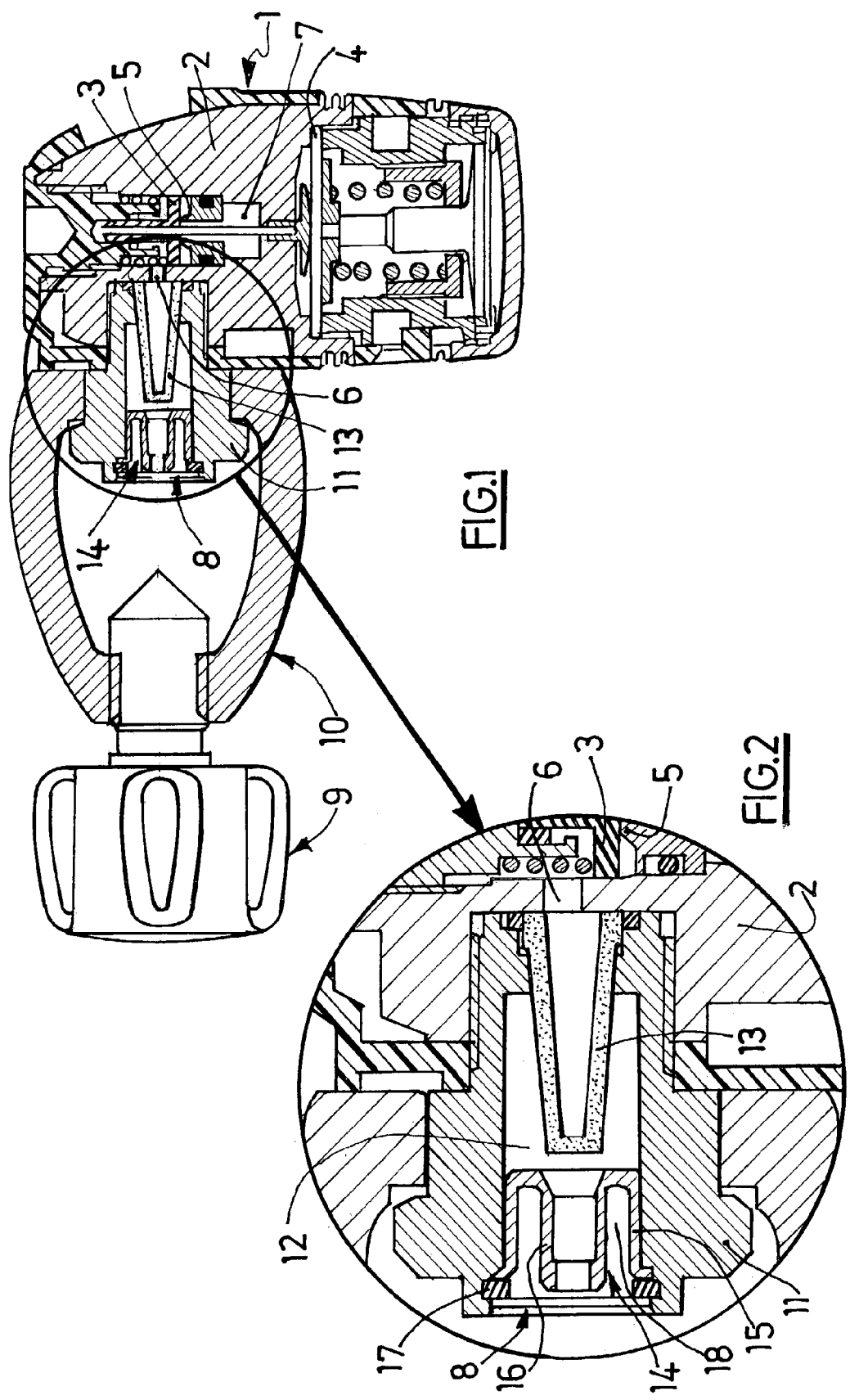

BREATHABLE PRESSURIZED-GAS REDUCING VALVE

CROSS-REFERENCE TO RELATED APPLICATIONS

This non-provisional application claims priority under 35 U.S.C. § 119(a) and (b)1 based on French Patent Application No. 0200149 filed Jan. 8, 2002 the disclosure of which is incorporated herein by reference.

BACKGROUND OF THE INVENTION

The present invention relates to breathable pressurized-gas reducing valves and more particularly to reducing valves intended for diving, of the type comprising a gas inlet passage connectable to a source of pressurized gas and incorporating a filter.

A reducing valve of this type is described for example in document U.S. Pat. No. 5,413,096—US Divers Co.

The filter in the inlet passage protects the reducing valve mechanism, and the mechanism of the downstream regulator, and also protects the user from any particles contained in the source of pressurized gas. However, during the manipulations of disconnecting the reducing valve from this source of pressurized gas, usually immediately after a dive, the source, and also the reducing valve and the auxiliary parts, are dripping with water and droplets may come into contact with the filter, the spongy consistency of which encourages it to remain wet and therefore encourages accelerated corrosion of the mechanisms, especially since, after this separation of the compressed gas source, the inlet is generally plugged with a protective cap, particularly for the pre-storage rinsing operations.

It is an object of the present invention to propose a reducing valve structure that avoids the abovementioned drawbacks.

To achieve this, the reducing valve comprises a water trap structure in the inlet passage upstream of the filter.

BRIEF SUMMARY OF THE INVENTION

According to more particular features of the invention:
the water trap structure comprises at least one reduced cross section gas passage conduit and, advantageously, at least one retaining volume around the gas passage conduit.

Other features and advantages of the present invention will emerge from the following description of one embodiment, given by way of entirely non-limiting illustration, given in relation to the appended drawings.

BRIEF DESCRIPTION OF THE DRAWINGS

FIG. 1 is a view in section of one embodiment of the reducing valve according to the invention; and
FIG. 2 is an enlarged view in part section of FIG. 1.

DETAILED DESCRIPTION OF PREFERRED EMBODIMENTS

FIG. 1 shows a so called stage one reducing valve, denoted overall by the reference 1 and comprising, in a body 2, moving valve gear 3 controlled by a diaphragm 4 and collaborating selectively with a valve seat 5 between a pressurized-gas inlet orifice 6 and a pressure-reduced-gas outlet chamber 7, the outlet gas being conveyed to a downstream breathing circuit (not depicted).

The reducing valve comprises an inlet end 8 intended to be connected to an outlet of a valve body of a gas cylinder fixed against the inlet 8 by a binding screw 9 carried by a yoke 10 secured to the reducing valve body 2.

In the embodiment depicted, the inlet 8 is formed by an interchangeable inlet piece 11 mounted laterally in the body 2 facing the inlet orifice 6 and defining a gas inlet passage 12 into this body.

In the downstream part of the inlet piece 11 is mounted a filter 13, typically made of sintered metal, advantageously of frustoconical shape as depicted.

According to one aspect of the invention, mounted in the upstream part of the inlet passage 12 is a water trap 14 which, in the example depicted, is in the form of a tubular piece integral with a peripheral cylindrical skirt 15 pushed into the passage 12 and a coaxial central tubular part 16 extending forward more or less as far as the plane of the circlip 17 that holds the piece 14 in place against its shoulder in the inlet passage 12.

With such an arrangement, it can be seen that the filter 13 (and the downstream air circuit) is protected from the outside by the water trap 15, the central tubular part 16 of which forms a reduced cross section gas inlet passage in line with the filter 13 surrounded by an annular gutter 18 opening to the outside, collecting and holding almost all of the droplets likely to enter the passage 12 via its inlet 8 and preventing this collected water from flowing subsequently to the filter 13, whatever the inclination of the reducing valve. Shaking or simply inverting the reducing valve allows any water that might have accumulated in the gutter 18 to be tipped out.

Although the present invention has been described in conjunction with one particular embodiment, it is not restricted thereto but can be modified and varied in ways that will be apparent to the person skilled in the art in the context of the claims which follow.

The invention claimed is:

1. A breathable pressurized-gas reducing valve comprising a gas inlet passage connectable to a source of pressurized gas and incorporating a filter, wherein:
   a) said reducing valve comprises a water trap structure in the inlet passage upstream of the filter;
   b) said water strap structure is annular and inserted in the inlet passage; and
   c) said water trap structure comprises a peripheral skirt and a coaxial central tubular part forming the gas passage conduit.

2. The reducing valve according to claim 1, wherein the water trap structure comprises at least one reduced cross section gas passage conduit.

3. The reducing valve according to claim 2, wherein the water trap structure comprises at least one liquid retaining volume around the gas passage conduit.

4. The reducing valve according to claim 1, wherein the water trap structure is held in the inlet passage by a circlip.

5. The reducing valve according to claim 1, wherein the filter and the water trap structure are arranged in an inlet component mounted in the body of the reducing valve.

* * * * *